United States Patent [19]

Ordo

[11] Patent Number: 4,932,281
[45] Date of Patent: Jun. 12, 1990

[54] FINAL DRIVE LOCKING MECHANISM FOR A DISENGAGEABLE DRIVE COUPLING

[75] Inventor: James P. Ordo, Plainfield, Ind.

[73] Assignee: General Motors Corporation, Detroit, Mich.

[21] Appl. No.: 371,150

[22] Filed: Jun. 26, 1989

[51] Int. Cl.$^5$ .......................... F16H 1/28; F16H 3/44; F16H 57/10
[52] U.S. Cl. ................................ 475/300; 192/109 A
[58] Field of Search ................. 74/785, 801; 180/53.1, 180/53.6, 53.7, 53.8, 53.3; 192/109 A

[56] References Cited

U.S. PATENT DOCUMENTS 4,043,226 8/1977 Buuck .................................. 74/801

Primary Examiner—Dwight Diehl
Assistant Examiner—Khoi Q. Ta
Attorney, Agent, or Firm—Donald F. Scherer

[57] ABSTRACT

The vehicle drive transmitting mechanism for a track laying vehicle has a coupling between the transmission output shaft and the final drive input. This coupling is disengageable from the transmission output shaft to permit vehicle towing or transmission removal. The coupling is movable from the drive connecting position to two other positions so that during towing, a neutral condition is attained and during transmission removal, a locking arrangement at the final drive is attained.

4 Claims, 2 Drawing Sheets

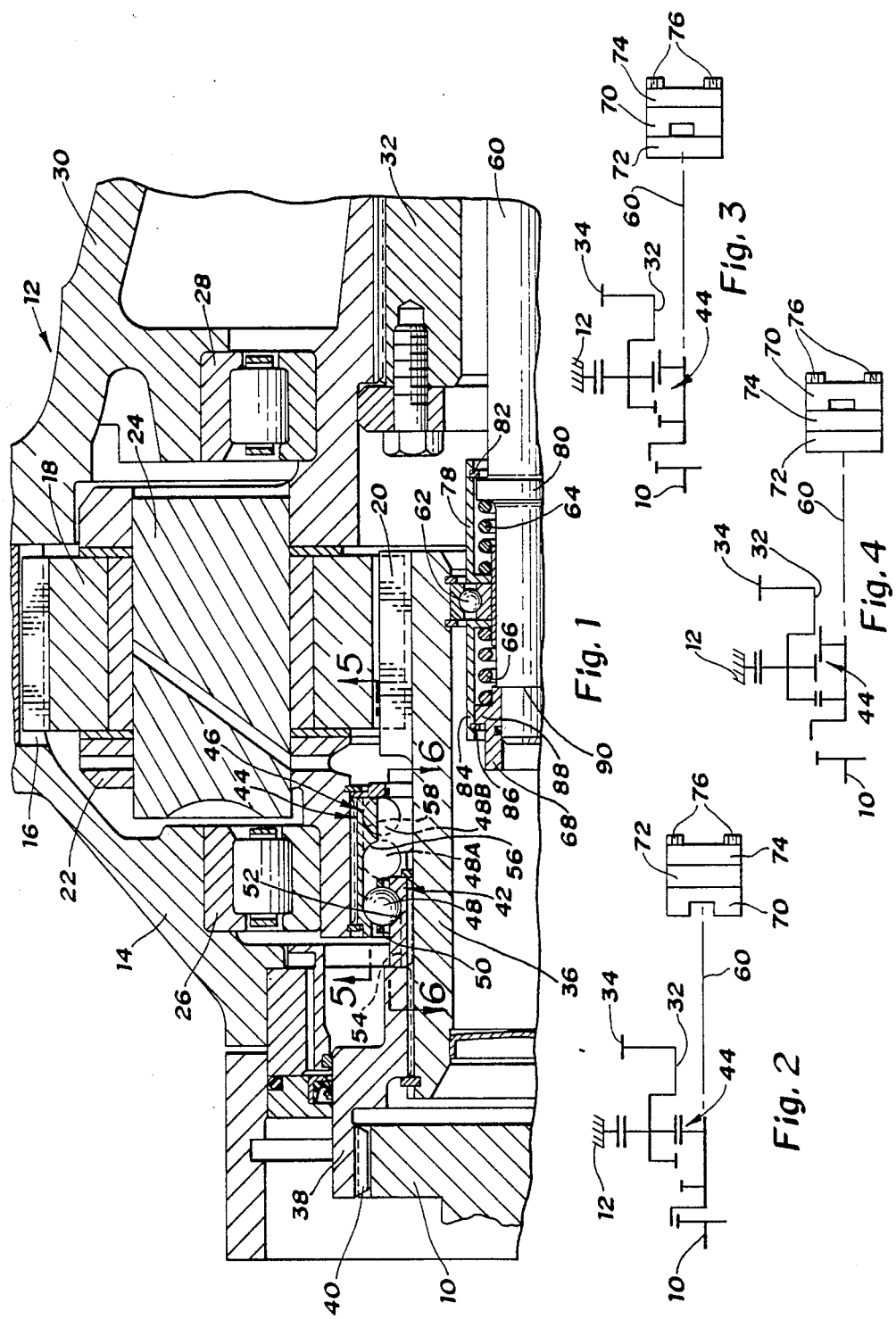

FINAL DRIVE LOCKING MECHANISM FOR A DISENGAGEABLE DRIVE COUPLING

The invention herein described was made in the course of work under a contract or subcontract thereunder with the Department of the Army.

BACKGROUND OF THE INVENTION

This invention relates to coupling devices, and more particularly to coupling devices used between a transmission output and a final drive input.

At times, it is necessary to tow a track laying vehicle to a repair shop or facility. When a track laying vehicle is to be towed, it is necessary to decouple the drive sprockets from the transmission output shafts. This is generally accomplished by removing a cover on the sprocket housing to gain access to a lateral positioning arrangement which controls the linear positioning of a shaft having a toothed coupler connected between the transmission output and the final drive gearing of the sprocket. One such mechanism is shown in U.S. Pat. No. 4,491,037 issued to Bullock, Jan. 1, 1985, and assigned to the assignee of this application.

The transmission is also decoupled from the final drive during repair or replacement of the transmission. At the completion of vehicle towing or during transmission replacement, the couplers have to be reconnected between the transmission shafts and the final drive gearing of each sprocket. With the prior art devices, at least three mechanics or technicians are required to attend to the recoupling maneuver. One mechanism operates the engine to cause control of the transmission output shaft while the other two mechanics control the linear movement of the couplers so that reengagement of the toothed components can be accomplished.

Also, while the transmission is removed from the vehicle, the tracks or sprockets of the vehicle must be braked to prevent inadvertent movement of the vehicle. This requires the mechanic or technician to locate material with which to block the tracks or the sprockets.

SUMMARY OF THE INVENTION

The present invention provides a significant improvement to the prior art. With the present invention, reengagement of the coupler can be accomplished by a single mechanic. Also, the mechanism of the present invention will provide a locking position for the final drive gear such that external blocking of the tracks or sprockets is not required.

A coupling assembly is provided with the present invention, wherein a drive coupling is selectively positionable by a shaft member to enforce disconnection of the transmission output shaft from the final drive unit in one position and to permit interconnection of two members of the final drive mechanism in another position. The drive coupling is interconnected with the shaft through a two-way lost motion device, which permits the shaft to be secured in any of the three positions without requiring a drive connection between the drive coupling and either the transmission output shaft or the two members of the final drive gearing.

Since these drive connections require proper angular orientation to permit digital registration prior to the completion of the drive connection, the lost motion device maintains a force on the drive coupling in a direction urging the desired drive connection. The desired drive connection will be completed when proper angular orientation is achieved.

During reconnection between the transmission output shaft and the final drive ratio, the mechanic simply operates the invention to cause rotation of the transmission output shaft, such that proper tooth alignment will occur. On transmission removal, if the locking position is not achieved by the coupling, any slight rotation of the drive sprocket will cause the proper toothed alignment for engagement to complete the locking position.

It is an object of this invention to provide an improved selectively disengageable drive connection between a transmission output and a final drive input herein the drive coupling is positionable at three locations, two of which require specific angular orientation of components, and further wherein a lost motion structure is employed to urge the drive coupling into the selective position, whereby the connection is completed when the specific angular orientation is reached.

It is another object of this invention to provide an improved drive connection which is selectively positionable by linear movement of the coupling shaft to interconnect a transmission output shaft in a final drive gearing input member, to disconnect the transmission output shaft and the gearing member, and to interconnect two members of the final drive gearing.

It is a further object of this invention to provide an improved drive connection, as described in the preceding object, wherein the drive coupling has (1) an outer race member secured for rotation with a member of the final drive gearing, with the race member having a free race portion and a locking portion; (2) an inner race member secured for rotation with a coupling portion which is selectively engageable with the transmission output shaft and continuously connected to a member of the final drive gearing with the race member having a free race portion and a locking portion; and (3) a ball assembly having a plurality of ball members selectively positionable in the free race portions of both races and the locking portion of both races as determined by the linear positioning of the coupling shaft.

It is yet another object of this invention to provide an improved drive connection incorporating the improvements of the preceding object, wherein the linear movable coupling shaft includes a lost motion connection permitting positioning of the coupling shaft regardless of the ability of the coupling portion and the locking portion of the outer race to be positioned to connect with the transmission output shaft or the locking portion of the inner race, respectively.

These and other objects and advantages of the invention will be more apparent from the following specification and drawings.

DESCRIPTION OF THE DRAWING

FIG. 1 is a cross sectional elevational view of a drive coupling incorporating the present invention.

FIGS. 2, 3 and 4 are schematic representations of three operating positions achievable with the drive coupling of the present invention.

DESCRIPTION OF THE EXEMPLARY EMBODIMENTS

Figure 5:
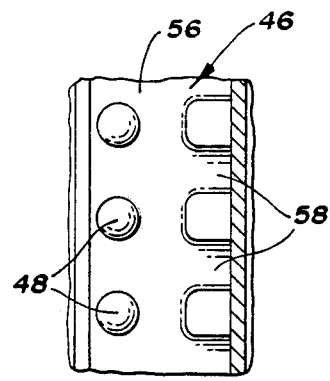
FIG. 5 is a view taken along line 5—5 of FIG. 1, showing a portion of the outer race of the drive coupling.
Figure 6:
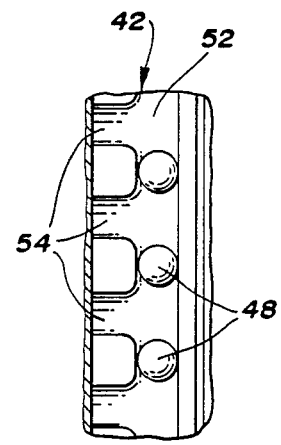
FIG. 6 is a view taken along line 6—6 of FIG. 1, showing a portion of the inner race of the drive coupling.

Referring to the drawings, wherein like characters represent the same or corresponding parts throughout the several views, there is seen in FIG. 1, a transmission output shaft 10 which is connected with an engine driven multi-range power transmission, not shown. The transmission is preferably of the type known as a cross drive transmission or a single input dual output type transmission. These transmissions are well known in the field of track laying vehicles, and a description of such transmissions is not necessary for a complete understanding of the present invention.

Also seen in FIG. 1, is a final drive gearing mechanism, generally designated 12. The final drive mechanism 12 includes a housing 14 in which is formed or otherwise secured a ring gear 16. The ring gear 16 meshes with a plurality of planet gears 18, which in turn, mesh with a sun gear 20. A planet carrier assembly 22 rotatably supports the planet gears 18 on shafts 24. The carrier assembly 22 is rotatably supported on a pair of bearings 26 and 28 rotatably supported in the housing 14, and an outer housing or cover 30, respectively. The carrier assembly 22 is drivingly connected to a vehicle output shaft 32, which in turn is connected to a sprocket, designated 34 in FIGS. 2, 3 and 4.

As is well known with track laying vehicles, at least two drive sprockets are provided, one on either side of the vehicle. Therefore, the drawings of FIGS. 1 through 7 are representative of one side of the vehicle drive arrangement. The other side of the vehicle will have a mirror image of this drive arrangement.

The sun gear 20 is formed integrally with a coupling shaft 36 which has splined thereto, a transmission coupling 38 disposed in toothed engagement at 40 with the transmission output shaft 10. Also splined to the coupling shaft 36 is an inner race 42 of a drive coupling assembly 44. The drive coupling assembly 44 also includes an outer race 46, which is splined to the planet carrier assembly 22 and is selectively interconnected with the inner race 42 by a plurality of balls 48. The balls 48 are interconnected by a cage 50 in a conventional manner.

The inner race 42 has a groove or free race portion 52 in which the balls 48 are permitted to roll freely, and a plurality of locking recess 54 in which the balls 48 can be individually trapped, preventing relative rotation between the balls 48 and the inner race 42.

The outer race 46 has a free race portion 56 in which the balls 48 are permitted to rotate freely relative to the outer race 46, and a plurality of locking recesses 58 which will individually accommodate the balls 48 to prevent relative movement between the balls 48 and the outer race 46.

As seen in solid lines in FIG. 1 and represented by the schematic of FIG. 2, the balls 48 are disposed in free race portions 52 and 56, such that relative rotation between the components is accommodated in a manner similar to that provided by a ball bearing. When the shaft 36 and drive coupling assembly 44 are moved longitudinally to the position of FIG. 3, the balls 48 will be placed in the position 48A, as represented in phantom line in FIG. 1. In this position, the balls 48 are still engaged in the free race portions 52 and 56, however, the toothed connection between the coupling 44 and transmission output shaft 10 has been disconnected. Thus, in the position of FIG. 3, the vehicle output is free to rotate relative to the transmission output shaft 10. This is the position that is maintained with the coupling when towing of the vehicle is desired.

Further longitudinal movement of the shaft 36 and inner race 42 will result in the balls 48 being disposed in the phantom position 48B shown in FIG. 1. This is represented schematically by FIG. 4. When the drive coupling assembly 44 is positioned, as represented by FIG. 4, the balls 48 are engaged in the respective recesses 54 and 58 of the inner and outer races 42 and 46. Since the outer race 46 is drivingly secured to the carrier assembly 22, the inner race 42 is drivingly secured to the sun gear 20 and the ring gear 18 is stationary, rotation of the output shaft 32 and therefore sprocket 34 is prevented. This is the position of the drive coupling of the present invention when the transmission is to be removed from the vehicle.

The coupling shaft 36 is moved longitudinally by a control mechanism including a rod or shaft 60, a ball bearing 62, a pair of springs 64 and 66, and a spring seat 68. The shaft 60 is positionable manually in a manner similar to that described in the above-mentioned U.S. Patent to Bullock, 4,491,037. The Bullock patent provides a linear control mechanism in which the end of shaft 60 is positioned by a block member 70, which in turn is positionable in the position shown in FIGS. 2, 3 and 4 by a pair of shim members 72 and 74, and a plurality of fasteners 76. The ball bearing 62 accommodates relative rotation between the shaft 60 and the coupling shaft 36.

The spring 64 is compressed between a spring seat 78 and a shoulder 80 formed on the shaft 60. Leftward movement of spring seat 78 is limited by a snap ring 82 and the shoulder 80. The spring seat 78 is disposed in abutment with one side of the inner race of the ball bearing 62. The spring 66 is compressed between the spring seat 68 and a spring seat 84, which is urged into abutment with the other side of the inner race of the ball bearing 62. Rightward movement of the spring seat 84 is limited by a snap ring 86 cooperating with a shoulder 88 formed on the spring seat 68, which in turn abuts a shoulder 90 formed on the shaft 60. The springs 64 and 66, along with their respective abutments, provide a two-way lost motion device which permits both leftward and rightward relative motion between the coupling shaft 36 and the shaft 60.

The springs 64 and 66 continuously urge the ball bearing 62 to a central position. The ball bearing 62 is connected for linear movement with the coupling shaft 36, such that the spring forces 64 and 66, when unbalanced, will urge the shaft 36 in one of two directions. If the coupling shaft 36 is moved to the position shown in FIG. 4, such that the balls 48 are urged to the position 48B but because of interference with the walls between the recesses 54 or 58 cannot achieve that position, the spring 66 will be further compressed imposing a rightward force on the shaft 36 and drive coupling assembly 42 urging the balls 48 to the position 48B. The spring 64 will be contained between spring seat 78 and shoulder 80. The spring seat 78 will be out of contact with the ball bearing 62.

Upon slight rotation of either the coupling shaft 36 or the carrier assembly 22, the balls 48 will be aligned with the recesses 54 and 58 whereupon the force in spring 66 will move the shaft 36 rightward longitudinally to complete the locking position. When it is desired to move the shaft 60 from either position FIG. 3 or FIG. 4 to position 2, whereupon the coupling shaft 36 will engage the transmission output shaft 10 and alignment between the teeth on coupling shaft 38 and shaft 10 are not aligned, the spring 64 will be compressed thereby imposing a leftward force on the coupling shaft 36 urging the transmission coupling 38 into toothed engagement with the shaft 10. The spring seat 84 will be out of contact with the bearing 62.

To complete the toothed engagement if blocking occurs, the operator will operate the engine to slowly rotate the transmission output, whereby the teeth on transmission coupling 38 will align with the transmission output shaft 10, such that force imposed by spring 64 will cause the shaft 36 to move leftward linearly thereby completing the drive connection and returning the lost motion device to the position shown.

Figure 7:
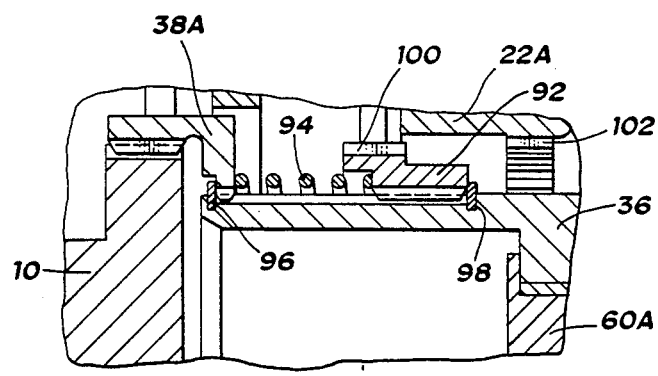
FIG. 7 is a partial view of the coupling, showing an alternate embodiment.

The alternate embodiment shown in FIG. 7 utilizes a toothed hub member 92 slidably disposed on the coupling shaft 36. A spline connection is formed between the hub 92 and the shaft 36. A coupling 38A is splined to the shaft 36 and is limited in leftward movement thereon by a snap ring 96. A second snap ring 98 limits the rightward movement of the hub 92. A compression spring 94 is trapped between the hub 92 and a transmission coupling 38A urging separation thereof. The spring 94 and its associated abutments permit relative movement between the coupling shaft 36 and both hub 92 and coupling 38A. Thus, a two-way lost motion structure is provided for the coupling shaft 36.

A plurality of teeth 100 are formed on the outer periphery of the hub 92. These teeth 100 are aligned for intermeshing with teeth 102 formed on the carrier assembly 22A. The linear movement of coupling shaft 36 is controlled by a shaft 60A, which is positionable in a manner similar to that described above for FIG. 1.

When the shaft 60A is moved to the position shown in FIG. 4, the hub 92 will move leftward relative to the coupling 36 if the teeth 100 and 102 do not mesh. However, slight rotation of either coupling shaft 36 or carrier assembly 22A will cause alignment of the teeth and completion of the drive connection. Since the coupling 36 is connected with the sun gear 20, this drive interconnection will cause two members of the planetary arrangement to be interconnected, and due to the connection of the ring gear to ground, locking of the final drive output is attained.

When the shaft 60A is moved from the position of FIG. 3 or 4 to the position of FIG. 2, the spring 94 will permit the coupling 38A to move rightward relative to the shaft 36 if the proper tooth arrangement between coupling 38A and transmission shaft 10 is not present.

As described above, the operator can manipulate the transmission output shaft through the operation of the vehicle engine because of proper tooth alignment wherein the drive connection is completed.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in vehicle drive transmitting systems in a vehicle having a removable power transmission including an output shaft with a drive connection thereon; an output sprocket; an output drive assembly having a planetary gear means including an output means continuously drivingly connected with the output sprocket and a first component held stationary for providing a reduction drive ratio between the power transmission and the output sprocket of the vehicle; and a selectively linearly movable drive coupling disposed in drive relation between the power transmission and the planetary gear means including a first gear member drivingly connectible with the drive connection on the output shaft of the power transmission and a second gear member drivingly connected as a second component in the planetary gear means; wherein the improvement comprises: drive means slidably disposed for limited linear movement on said drive coupling; locking means secured with one of the components of said planetary gear means in a position to be engaged by said drive means upon linear movement of said drive coupling, in a direction to disengage said first gear member from said power transmission output shaft to thereby drivingly interconnect two components of said planetary gear means to said drive coupling to prevent rotation of said output sprocket.

2. An improvement in vehicle drive transmitting systems in a vehicle having a removable power transmission including an output shaft with a drive connection thereon; an output sprocket; an output drive assembly having a planetary gear means including an output means continuously drivingly connected with the output sprocket and a first component held stationary for providing a reduction drive ratio between the power transmission and the output sprocket of the vehicle; and a selectively linearly movable drive coupling disposed in drive relation between the power transmission and the planetary gear means including a first gear member drivingly connectible with the drive connection on the output shaft of the power transmission and a second gear member drivingly connected as a second component in the planetary gear means; wherein the improvement comprises: means for moving the drive coupling to three operating positions (1) a drive position, (2) a nondrive position and (3) a lock position, including drive means slidably disposed for limited linear movement for selectively connecting said output shaft to said planetary gear means, and for selectively disconnecting said output shaft from said planetary gear means; locking means secured with one of the components of said planetary gear means in a position to be engaged by said drive means upon linear movement of said drive coupling, in a direction to disengage said first gear member from said power transmission output shaft to thereby drivingly interconnect two components of said planetary gear means to said drive coupling to prevent rotation of said output sprocket; and two-way lost motion means for permitting said drive coupling to be moved to the three positions without requiring an immediate drive connection between said transmission output shaft and said planetary gear means or an immediate drive connection between two components of the planetary gear means and for imposing a force on said drive means in a direction urging a drive connection until the drive connection is completed.

3. An improvement in vehicle drive transmitting systems in a vehicle having a removable power transmission including an output shaft with a drive connection thereon; an output sprocket; an output drive assembly having a planetary gear means including an output means continuously drivingly connected with the output sprocket and a first component held stationary for providing a reduction drive ratio between the power transmission and the output sprocket of the vehicle; and a selectively linearly movable drive coupling disposed in drive relation between the power transmission and the planetary gear means including a first gear member drivingly connectible with the drive connection on the output shaft of the power transmission and a second gear member drivingly connected as a second component in the planetary gear means; wherein the improvement comprises: drive connecting means movable to three positions with said drive coupling including locking means having a first ball race with a free race portion and a lock recess portion and being drivingly connected with a component of the planetary gear means, a second ball race with a free race portion and a lock recess portion and being drivingly connected with said drive means and ball race means disposed between said first and second race portions and cooperating therewith to permit relative rotation between said first and second ball races in two of said three positions and preventing relative rotation therebetween in the third position whereby a drive connection is provided between the output shaft and the planetary gear means in one of said two positions and a locking connection in said planetary gear means in the third position; control means including two-way lost motion means for moving said drive connecting means for permitting relative movement between the control means and the drive connecting means when the drive connection to the output shaft is misaligned and when the ball means and the lock recess means are misaligned.

4. the invention defined in claim 3, wherein the lost motion means continually urges the locking means to the first position when the control means is moved to the first position and the third position when the control means is moved to the third position, whereby the desired connection will be made in the locking means when the misaligned condition is corrected.

* * * * *